United States Patent
Lee et al.

(10) Patent No.: US 7,511,774 B2
(45) Date of Patent: Mar. 31, 2009

(54) THREE-DIMENSIONAL DISPLAY DEVICE

(75) Inventors: Hyo-Jin Lee, Yongin-si (KR); Jang-Doo Lee, Yongin-si (KR); Hyoung-Wook Jang, Yongin-si (KR); Hui Nam, Yongin-si (KR); Beom-Shik Kim, Yongin-si (KR); Myoung-Seop Song, Yongin-si (KR); Ja-Seung Ku, Yongin-si (KR)

(73) Assignee: Samsung Mobile Display Co., Ltd., Suwon-si (KR)

( * ) Notice: Subject to any disclaimer, the term of this patent is extended or adjusted under 35 U.S.C. 154(b) by 334 days.

(21) Appl. No.: 11/584,047

(22) Filed: Oct. 20, 2006

(65) Prior Publication Data

US 2007/0120768 A1  May 31, 2007

(30) Foreign Application Priority Data

Nov. 30, 2005  (KR) .................... 10-2005-0115586

(51) Int. Cl.
G02F 1/1335 (2006.01)
(52) U.S. Cl. ....................................... 349/15
(58) Field of Classification Search ............. None
See application file for complete search history.

(56) References Cited

U.S. PATENT DOCUMENTS 6,137,456 A  10/2000 Bhagavatula et al.
2007/0019119 A1* 1/2007 Tanaka et al. ............ 349/15

FOREIGN PATENT DOCUMENTS

| EP | 0 778 440 A2 | 6/1997 |
| GB | 2052474 A | 1/1981 |
| GB | 2056433 A | 3/1981 |
| JP | 53-20794 | 2/1978 |
| JP | 63-140509 U | 9/1988 |
| JP | 5-72563 | 3/1993 |

(Continued)

OTHER PUBLICATIONS

Patent Abstracts of Japan, Publication No. 05-232403; Date of Publication: Sep. 10, 1993; in the name of Ikuo Kato.

(Continued)

*Primary Examiner*—Sung H Pak
(74) *Attorney, Agent, or Firm*—Christie, Parker & Hale, LLP

(57) ABSTRACT

A three-dimensional display device includes an image display portion displaying left and right eye images, and a parallax barrier directing the left and right eye images respectively towards left and right eyes of a user.

The parallax barrier includes first electrodes located on a first substrate, a first connection electrode electrically connecting the first electrodes, a first terminal electrode connected to an end of the first connection electrode, a first connection terminal connected to the first terminal electrode, second electrodes located between the first electrodes, a second connection electrode electrically connecting the second electrodes, a second connection terminal connected to an end of the second connection electrode, a common electrode located on a second substrate facing the first substrate, and a liquid crystal layer disposed between the first and second substrates.

The first terminal electrode has a lower electric resistance than the first electrodes and the second electrodes.

17 Claims, 8 Drawing Sheets

FOREIGN PATENT DOCUMENTS

| | | |
|---|---|---|
| JP | 5-232403 | 9/1993 |
| JP | 2003-5670 | 1/2003 |
| JP | 2004-14798 | 1/2004 |
| JP | 2005-134663 | 5/2005 |
| KR | 2001-0011108 | 2/2001 |

OTHER PUBLICATIONS

Korean Patent Abstracts, Publication No. 1020010011108 A; Date of Publication: Feb. 15, 2001; in the name of Gyeong Mi Cho et al.

European Search Report dated Mar. 19, 2007, for EP 06125071.8, in the name of Samsung SDI Co., Ltd.

Patent abstracts of Japan for publication No. 2003-005670 dated Jan. 8, 2003 filed in the name of Masanobu Nonaka, et al.

Patent abstracts of Japan for publication No. 2004-014798 dated Jan. 15, 2004 filed in the name of Akira Oi.

European Search Report dated Mar. 27, 2008 for corresponding European patent application No. 06125071.8, indicating relevance of listed references in this IDS and references listed in a previously filed IDS dated Jun. 12, 2007.

* cited by examiner

THREE-DIMENSIONAL DISPLAY DEVICE

CROSS-REFERENCE TO RELATED APPLICATION

This application claims priority to and the benefit of Korean Patent Application No. 10-2005-0115586 filed in the Korean Intellectual Property Office on Nov. 30, 2005, the entire content of which is incorporated herein by reference.

BACKGROUND OF THE INVENTION

1. Field of the Invention

The present invention relates to a three-dimensional display device, and in particular, to an autostereoscopic three-dimensional display device using a parallax barrier.

2. Description of the Related Art

A three-dimensional display device may be categorized as a stereoscopic display device where a user wears viewing aids such as polarizing glasses, or an autostereoscopic display device where the user can see a desired three-dimensional image without wearing such viewing aids.

A common autostereoscopic display device utilizes an optical separation element, such as a lenticular lens, a parallax barrier, or a microlens array, to spatially separate or isolate the left-eye image part and the right-eye image part displayed at an image display unit in the directions of the left and right eyes of the user, respectively.

In particular, the parallax barrier may be formed with a liquid crystal shutter utilizing a transmission type liquid crystal display, and in this case, it may be converted between a two-dimensional mode and a three-dimensional mode. Thus the parallax barrier can be applied to laptop computers or cellular phones.

Generally, the parallax barrier includes stripe-shaped light interception portions and light transmission portions. It selectively separates left and right eye images displayed at the image display unit through the light transmission portions such that the left and right eye images are respectively provided to the left and right eyes of the user.

A common three-dimensional display device having a parallax barrier displays left and right eye images according to left and right image signals inputted to pixels of the image display portion, and it separates the left and right eye images spatially by using the parallax barrier.

However, since the left and right images are entered into the respective eyes of the user, the resolution of a three-dimensional image is no more than half as fine as that of a two-dimensional image.

To solve this problem, a time-sharing type of three-dimensional display device has been developed.

An image display portion of the time-sharing type of three-dimensional display device shows patterns of left and right eye images, and the patterns of the left and right eye images are changed alternately at a given frequency. Patterns of the light interception portions and the light transmission portions of the parallax barrier are changed alternately at the given frequency.

Consequently, the time-sharing type of three-dimensional display device provides a three-dimensional image having a resolution as fine as that of a two-dimensional image.

The parallax barrier of the time-sharing type three-dimensional display device may be formed with a liquid crystal shutter utilizing a transmission type of liquid crystal display, and the liquid crystal display may include first electrodes and second electrodes formed in a striped pattern and arranged alternately and repeatedly relative to each other.

Accordingly, the first electrodes and the second electrodes of the liquid crystal display are arranged corresponding to an image for the left eye and an image for the right eye displayed by the image display portion. A driving voltage is applied alternately and repeatedly to the first electrodes and to the second electrodes during operation of the image display portion.

Light transmittance rates of portions of the parallax barrier corresponding to each of the electrodes should be uniform to enable the user to see images having a uniform brightness during the operation of the image display portion.

However, it is difficult for the time-sharing type of three-dimensional display device to maintain a uniform light transmittance rate due to differing lengths of electrode paths along which applied voltages are conducted.

SUMMARY OF THE INVENTION

It is an aspect of the present invention to provide a three-dimensional display device that can maintain a uniform light transmittance rate at portions corresponding to electrodes of the device during operation of the device.

In exemplary embodiments according to the present invention, a three-dimensional display device with one or more of the following features is provided.

The three-dimensional display device includes an image display portion adapted to display left and right eye images, and a parallax barrier facing the image display portion and adapted to direct the left and right eye images displayed by the image display portion toward a left eye and a right eye of a user, respectively.

The parallax barrier includes a first substrate, first electrodes located on the first substrate, a first connection electrode for electrically connecting the first electrodes, a first terminal electrode connected to an end of the first connection electrode, a first connection terminal connected to an end of the first terminal electrode and adapted to apply a voltage to the first electrodes and the first connection electrode, second electrodes located between the first electrodes, a second connection electrode for electrically connecting the second electrodes, a second connection terminal connected to an end of the second connection electrode and adapted to apply a voltage to the second electrodes and the second connection electrode, a second substrate facing the first substrate, a common electrode located on the second substrate, and a liquid crystal layer located between the first and second substrates.

The first terminal electrode may have an electric resistance lower than respective electric resistances of each of the first electrodes and the second electrodes.

The first terminal electrode may be formed with a material used to form the first and second electrodes, and the first terminal electrode may have a width that is greater than respective widths of each of the first and second electrodes.

The first terminal electrode may be formed with a material that has a lower resistivity than a material used to form the first and second electrodes.

The second connection electrode may include an auxiliary connection electrode having a first end connected to the second connection terminal and having a second end connected to a portion of the second connection terminal connected to respective ends of each of the second electrodes. The auxiliary connection electrode may be adapted to reduce the level of a voltage effectively applied to the second electrodes.

A three-dimensional display device may include an image display portion adapted to display left and right eye images and a parallax barrier. The parallax barrier may include a first substrate, first electrodes located on the first substrate, a first connection electrode for electrically connecting the first electrodes, a first terminal electrode connected to an end of the first connection electrode, a first connection terminal connected to an end of the first terminal electrode and adapted to apply a voltage to the first electrodes and the first connection electrode, second electrodes located between the first electrodes, a second connection electrode for electrically connecting the second electrodes, a second connection terminal connected to an end of the second connection electrode and adapted to apply a voltage to the second electrodes and the second connection electrode, a second substrate facing the first substrate, a common electrode located on the second substrate, and a liquid crystal layer located between the first substrate and the second substrate.

The second connection electrode may have an electric resistance that is higher than an electric resistance of the first connection electrode.

The second connection electrode may be formed with a material that is used to form the first connection electrode, and the second connection electrode may have a width that is smaller than a width of the first connection electrode.

The second connection electrode may be formed with a material that has greater resistivity than a material used to form the first connection electrode.

The second connection electrode may include an auxiliary connection electrode having a first end that is connected to the second connection terminal and having a second end connected to a portion of the second connection electrode connected to respective ends of each of the second electrodes, and the auxiliary connection electrode is adapted to reduce the level of a voltage effectively applied to the second electrodes.

A three-dimensional display device may include an image display portion adapted to display left eye images and right eye images, and a parallax barrier facing the image display portion and adapted to direct the left and right eye images displayed by the image display portion towards a left eye and a right eye of a user, respectively.

The parallax barrier may include a first substrate, first electrodes located on the first substrate and extending along a first direction, a first connection electrode for electrically connecting the first electrodes, a first terminal electrode connected to an end of the first connection electrode, a first connection terminal connected to an end of the first terminal electrode and adapted to apply a voltage to the first electrodes and the first connection electrode, second electrodes located between the first electrodes, a second connection electrode for electrically connecting the second electrodes, a second connection terminal adapted to apply a voltage to the second electrodes and the second connection electrode, a second substrate facing the first substrate, third electrodes located on the second substrate and extending along a second direction that is perpendicular to the first direction, a third connection electrode for electrically connecting the third electrodes, a third connection terminal adapted to apply a voltage to the third electrodes and the third connection electrode, fourth electrodes located between the third electrodes, a fourth connection electrode for electrically connecting the fourth electrodes, a fourth terminal electrode connected to an end of the fourth connection electrode, a fourth connection terminal connected to an end of the fourth terminal electrode and adapted to apply a voltage to the fourth electrodes and the fourth connection electrode, and a liquid crystal layer located between the first substrate and the second substrate.

Each of the first electrodes and the second electrodes may have respective widths equal to each other, and the first terminal electrode may have an electric resistance lower than respective electric resistances of each of the first electrodes and the second electrodes.

Each of the third electrodes and the fourth electrodes may have respective widths equal to each other, and the fourth terminal electrode may have an electric resistance lower than respective electric resistances of each of the third electrodes and the fourth electrodes.

The first terminal electrode may be formed with a material that is used to form the first electrodes and the second electrodes and has a width that is greater than respective widths of each of the first electrodes and the second electrodes.

The fourth terminal electrode may be formed with a material that is used to form the third electrodes and the fourth electrodes and has a width that is greater than respective widths of each of the third electrodes and the fourth electrodes.

The first terminal electrode may be formed with a material that has a lower resistivity than a material used to form the first electrodes and the second electrodes, and the fourth terminal electrode may be formed with a material that has a lower resistivity than a material used to form the third electrodes and the fourth electrodes.

DETAILED DESCRIPTION

The present invention will be described more fully hereinafter with reference to the accompanying drawings, in which certain exemplary embodiments of the present invention are shown.

Figure 1:
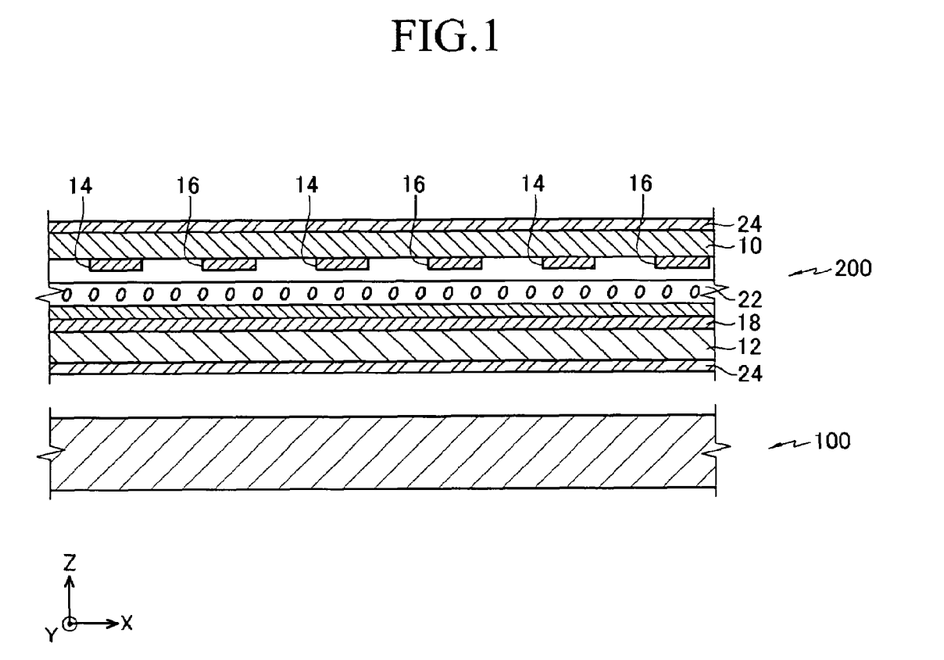
FIG. 1 is a sectional view of a three-dimensional display device according to a first exemplary embodiment of the present invention.

FIG. 1 is a sectional view of a three-dimensional display device according to a first exemplary embodiment of the present invention.

As shown in FIG. 1, the three-dimensional display device includes an image display portion 100 and a parallax barrier 200.

The image display portion 100 displays left eye images and right eye images having a predetermined pattern.

A first image and a second image that have different patterns of the left eye image and the right eye image are displayed repeatedly on the image display portion 100 at a frequency, wherein the frequency may be predetermined.

Any suitable display devices may be used as the image display portion 100. For instance, the image display portion 100 may be formed with a cathode ray tube, a liquid crystal display, a plasma display panel, a field emission display device, an organic electroluminescence display device, or any other suitable display devices.

The parallax barrier 200 may be formed with a liquid crystal shutter. The parallax barrier 200 includes a first substrate 10 and a second substrate 12 facing each other.

The first substrate 10 and the second substrate 12 may be formed with a glass substrate having a rectangular shape.

Electrodes are arranged on respective inner surfaces of the first substrate 10 and the second substrate 12 and operate a liquid crystal layer 22 located between the first substrate 10 and the second substrate 12.

First electrodes 14 and second electrodes 16 are arranged on the first substrate 10. A common electrode 18 is arranged on the second substrate 12.

The first electrodes 14, the second electrodes 16, and the common electrode 18 may be formed with a transparent material such as Indium Tin Oxide (ITO).

Polarizing plates 24 and 24' may be located on respective outer surfaces of the first substrate 10 and the second substrate 12.

The structures of the first electrode 14 and the second electrode 16 will be described hereinafter in more detail.

Figure 2:
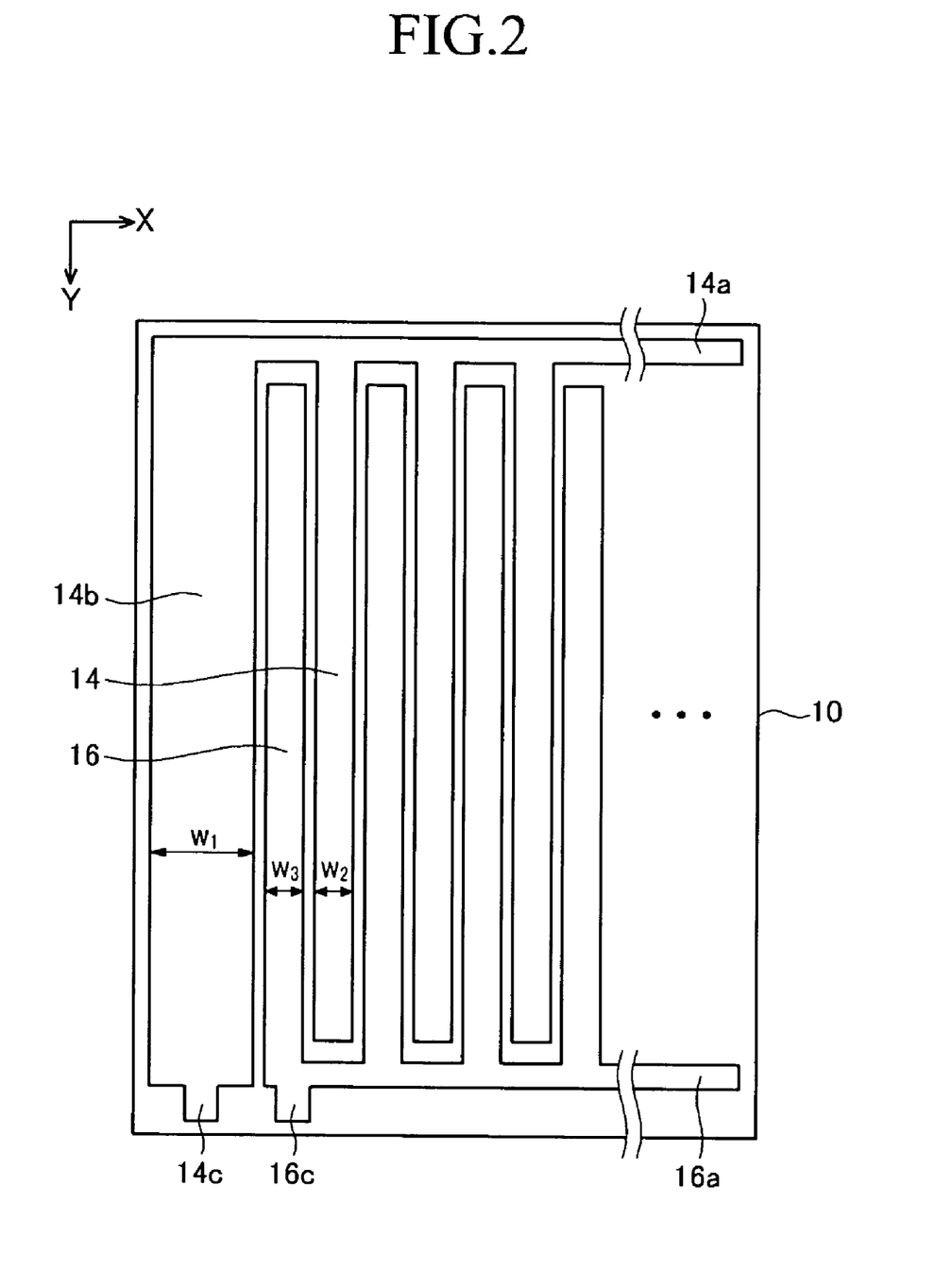
FIG. 2 is a plan view of a parallax barrier in the first exemplary embodiment of the present invention.

FIG. 2 shows structures of the first electrodes 14 and the second electrodes 16 arranged on the first substrate 10 in the first exemplary embodiment of the present invention.

As shown in FIG. 2, the first electrodes 14 arranged on the first substrate 10 extend along a direction corresponding to a longer side of the first substrate 10 (the direction of the Y-axis in FIG. 2).

The first electrodes 14 are arranged in a striped pattern on the first substrate 10.

A first connection electrode 14a electrically connecting the first electrodes 14 extends along a direction corresponding to a shorter side of the first substrate 10 (the direction of the X-axis in FIG. 2) and is connected to respective ends of each of the first electrodes 14.

A first terminal electrode 14b extends along a direction parallel to the first electrodes 14 and is connected to an end of the first connection electrode 14a.

A first connection terminal 14c is arranged at an end of the first terminal electrode 14b and applies voltage to the first connection electrode 14a and the first electrodes 14 through the first terminal electrode 14b.

In substantially the same way the first electrodes 14 and the first connection electrode 14a are arranged, the second electrodes 16 and a second connection electrode 16a electrically connecting the second electrodes 16, are arranged on the first substrate 10.

In more detail, the second electrodes 16 extend along the direction corresponding to the longer side of the first substrate 10 (the direction of the Y-axis in FIG. 2).

The second electrodes 16 are arranged between the first electrodes 14 in a striped pattern.

A second connection electrode 16a extends along the direction corresponding to the shorter side of the first substrate 10 and is connected to respective ends of each of the second electrodes 16.

A second connection terminal 16c is arranged at an end of the second connection electrode 16a and applies voltage to the second electrodes 16 and the second connection electrode 16a.

In the first exemplary embodiment, the width of the first terminal electrode 14b $w_1$ is greater than the respective widths of the first electrodes 14 $w_2$ and of the second electrodes 16 $w_3$.

Pixel arrays and an operation of the image display portion will be described hereinafter in more detail.

Figure 3A:
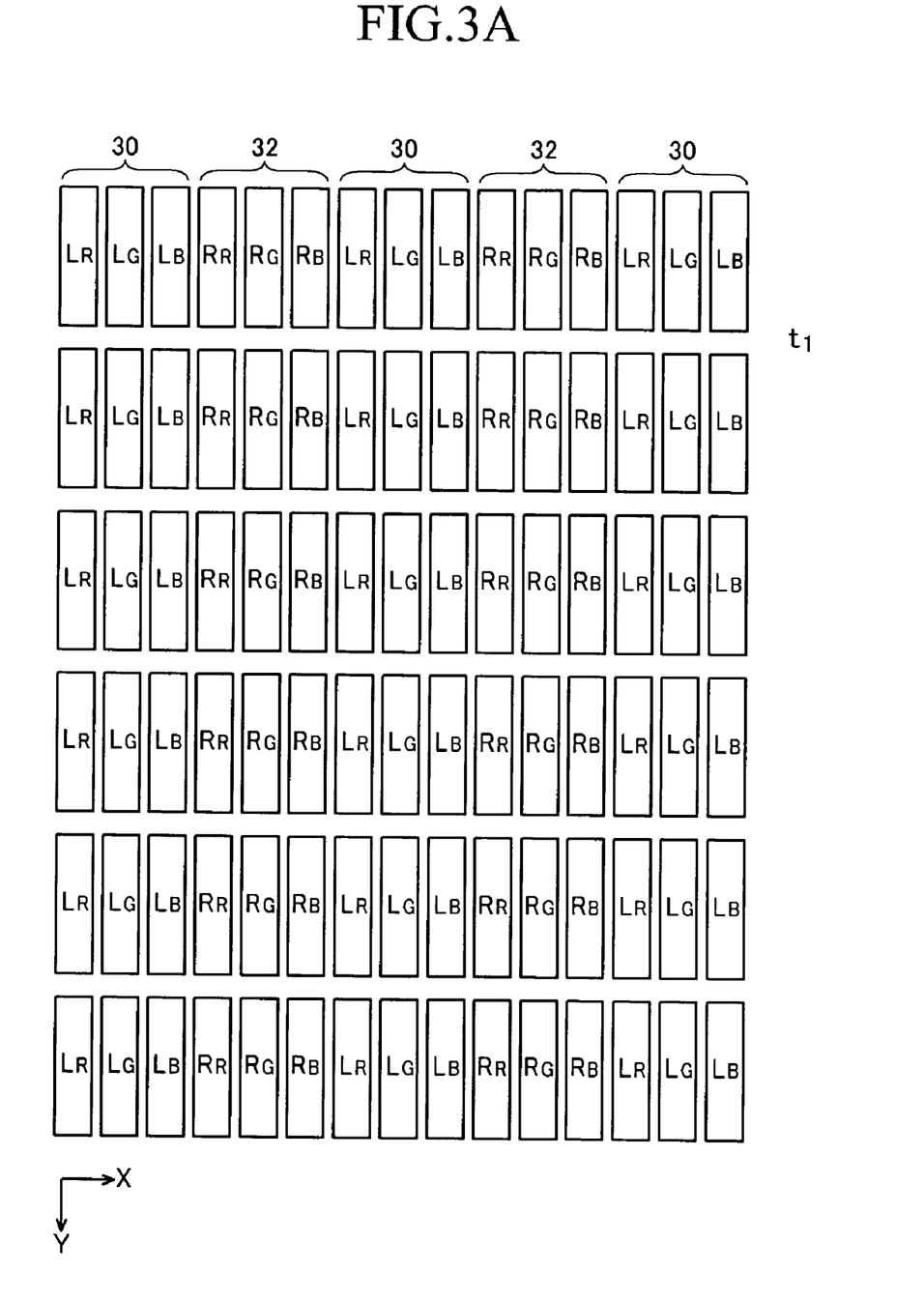
FIG. 3A and FIG. 3B are schematic views of pixel arrays of an image display portion in the first exemplary embodiment of the present invention.
Figure 3B:
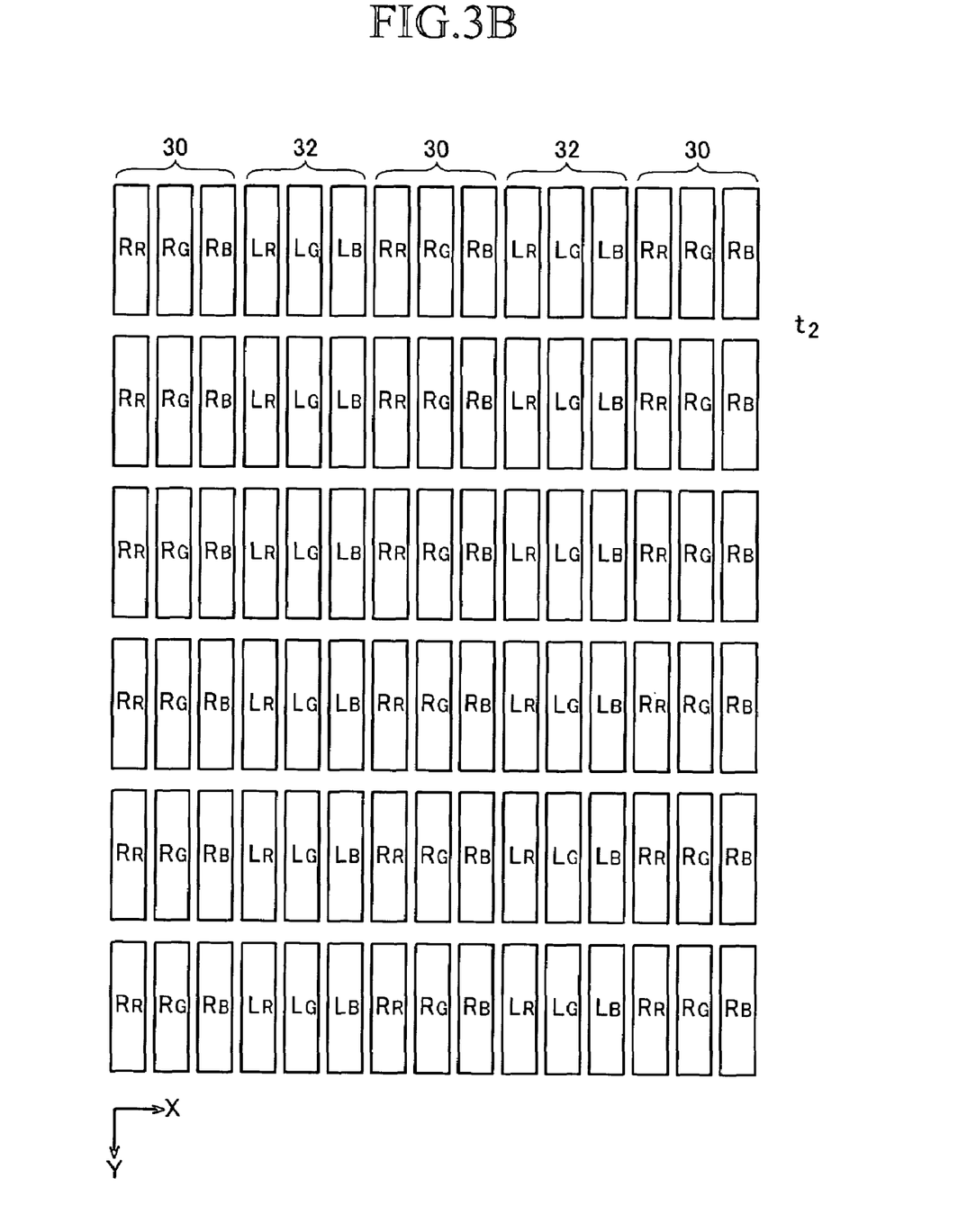

FIG. 3A and FIG. 3B respectively show pixel arrays of the image display portion during a first period $t_1$ and a second period $t_2$.

First pixels 30 and second pixels 32, each consisting of sub pixels, are arranged along a vertical direction of the image display portion 100 (the direction of the Y-axis in FIG. 3A) and are arranged alternately and repeatedly along a horizontal direction of the image display portion 100 (the direction of the X-axis in FIG. 3A).

As shown in FIG. 3A, during the first period $t_1$, the first pixels 30 display left eye images $L_R$, $L_G$, and $L_B$ corresponding to a left eye image signal, and the second pixels 32 display right eye images $R_R$, $R_G$ and $R_B$ corresponding to a right eye image signal. In this way, a first image is displayed on the image display portion during the first period $t_1$.

In the first period $t_1$, a driving voltage is applied to the first electrodes 14 at the first connection terminal 14c through the first terminal electrode 14b and the first connection electrode 14a.

A reference voltage, which by way of example may be a ground voltage, is applied to the second electrodes 16 at the second connection terminal 16c through the second connection electrode 16a. The reference voltage is also applied to the common electrode 18.

Accordingly, when the parallax barrier 200 is a liquid crystal display of a normally white mode of transmission, portions of the barrier on which the first electrodes 14 are located become light interception portions, and portions of the barrier on which the second electrodes 16 are located become light transmission portions.

In contrast, when the parallax barrier 200 is a liquid crystal display of a normally black mode of transmission, portions of the barrier on which the first electrodes 14 are located become light transmission portions, and portions of the barrier on which the second electrodes 16 are located become light interception portions.

As shown in FIG. 3B, in contrast to the first period $t_1$, during the second period $t_2$, the first pixels 30 display right eye images $R_R$, $R_G$, and $R_B$ corresponding to a right eye image signal, and the second pixels 32 display left eye images $L_R$, $L_G$, and $L_B$ corresponding to a left eye image signal.

In this way, a second image is displayed on the image display portion during the second period $t_2$.

In the second period $t_2$, the reference voltage is applied to the first electrodes 14 at the first connection terminal 14c through the first terminal electrode 14b and the first connection electrode 14a.

The driving voltage is applied to the second electrodes 16 at the second connection terminal 16c through the second connection electrode 16a. The reference voltage is applied to the common electrode 18.

Accordingly, when the parallax barrier is a liquid crystal display of a normally white mode of transmission, portions of the barrier on which the second electrodes 16 are located become the light interception portions, and portions of the barrier on which the first electrodes 14 are located become the light transmission portions.

In contrast, when the parallax barrier is a liquid crystal display of a normally black mode of transmission, portions of the barrier on which the second electrodes 16 are located become the light transmission portions, and portions of the barrier on which the first electrodes 14 are located become the light interception portions.

According to the operation of the image display portion 100 and the parallax barrier 200 as described above, the left eye of a user sees the image displayed by the first pixels 30 during the first period $t_1$ and the image displayed by the second pixels 32 during the second period $t_2$.

The right eye of the user sees the image displayed by the second pixels 32 during the first period $t_1$ and sees the image displayed by the first pixels 30 during the second period $t_2$.

Accordingly, the user can see a three-dimensional image having a resolution that is as fine as a resolution of a two-dimensional image.

The light interception portions formed during the first period $t_1$ and the light interception portions formed during the second period $t_2$ should have light transmittance rates substantially equal to each other in order to provide three-dimensional images that are natural in appearance to the user.

Similarly, the light transmission portions formed during the first period $t_1$ and the light transmission portions formed during the second period $t_2$ should have light transmittance rates substantially equal to each other.

Accordingly, the level of the voltage effectively applied at the first electrodes 14 during the first period $t_1$ and the level of the voltage effectively applied at the second electrodes 16 during the second period $t_2$ should be substantially equal to each other.

However, as shown in FIG. 2, the paths from the first connection terminal 14*c* and the second connection terminal 16*c* to the first and second electrodes 14 and 16, respectively, are different in length from one another.

That is, when voltages of a uniform level are applied to the first and second connection terminals 14*c* and 16*c*, a voltage drop due to the electrical resistance of the first terminal electrode 14*b* results, and therefore the voltage effectively applied at the first electrodes 14 is substantially lower than that effectively applied at the second electrodes 16.

The resistance of the first terminal electrode 14*b* is determined by Formula 1.

Formula 1

$$R = \rho l/A \quad (1)$$

In Formula 1, R represents electrical resistance of the first terminal electrode 14*b*, $\rho$ represents resistivity of the material of the first terminal electrode 14*b*, I represents the length of the first terminal electrode 14*b*, and A represents the sectional area of the first terminal electrode 14*b*.

When the resistance R of the first terminal electrode 14*b* decreases, the magnitude of the voltage drop decreases. Accordingly the difference between the voltage effectively applied at the first electrodes 14 and the voltage effectively applied at the second electrodes 16 can be reduced.

As shown in FIG. 2, the first terminal electrode 14*b* has a relatively large width in order to reduce the resistance R of the first terminal electrode 14*b* in the first exemplary embodiment of the invention. That is, referring back to Formula 1, the resistance R decreases by increasing the sectional area A of the first terminal electrode 14*b*.

In a three-dimensional display device according to a second exemplary embodiment of the present invention, a first terminal electrode is formed with a material having a relatively low resistivity $\rho$, and the widths of the first terminal electrode, the first electrodes and the second electrodes are configured to be substantially equal to one another.

Accordingly, the difference between the voltage effectively applied at the first electrodes and the voltage effectively applied at the second electrodes can be reduced.

In this case, the first electrodes and the second electrodes may be formed with transparent ITO, and the first terminal electrode may be formed with a metal having a relatively lower resistivity $\rho$, such as silver (Ag), copper (Cu) and the like.

Since the structures of other elements of the three-dimensional display device of the second exemplary embodiment are substantially similar to corresponding elements of the first exemplary embodiment described above, a detailed description of the other elements is omitted.

Figure 4:
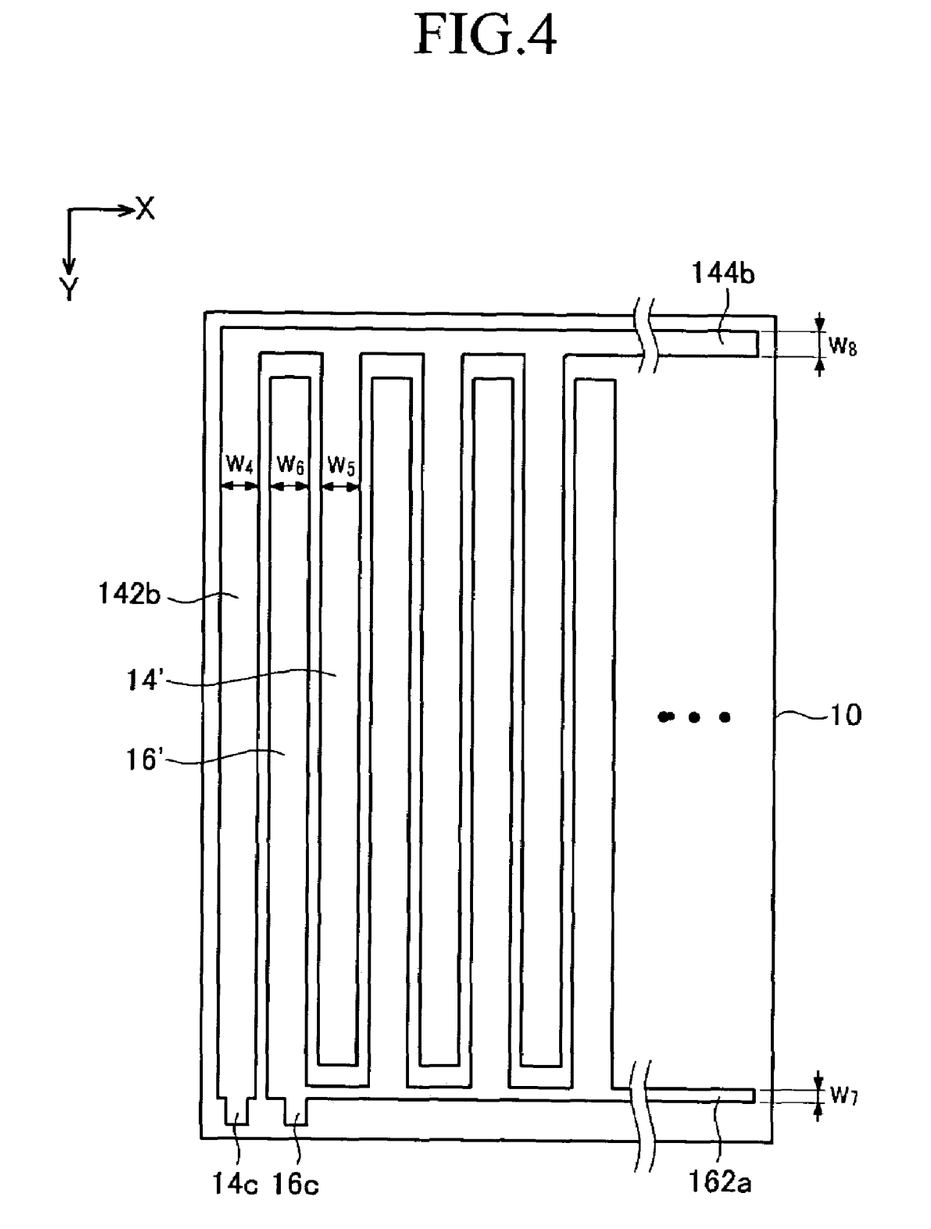
FIG. 4 is a plan view of a parallax barrier in a third exemplary embodiment of the present invention.

FIG. 4 shows structures of first electrodes 14' and second electrodes 16' in a three-dimensional display device according to a third exemplary embodiment of the present invention.

As shown in FIG. 4, a first terminal electrode 142*b* has the same width as each of the first electrodes 14' and each of the second electrodes 16' ($w_4 = w_5 = w_6$) and is formed with the same material as the first electrodes 14' and the second electrodes 16'.

However, a second connection electrode 162*a* has a smaller width than a first connection electrode 144*b* ($w_7 < w_8$) such that the second connection electrode 162*a* has a higher electrical resistance than the first connection electrode 144*b*.

In the third exemplary embodiment of the present invention, the relatively higher electrical resistance of the second connection electrode 162*a* can at least partially match (or compensate) the voltage drop over the first terminal electrode 142*b* resulting from the electrical resistance of the first terminal electrode 142*b*.

Thus, the voltages effectively applied at the first electrodes 14' and the second electrodes 16' can be maintained more equally.

Alternatively, the second connection electrode 162*a* may be formed with a material that has higher resistivity than a material used to form the first connection electrode 144*b* while the widths of the second connection electrode 162*a* and the first connection electrode 144*b* are kept uniform.

Figure 5:
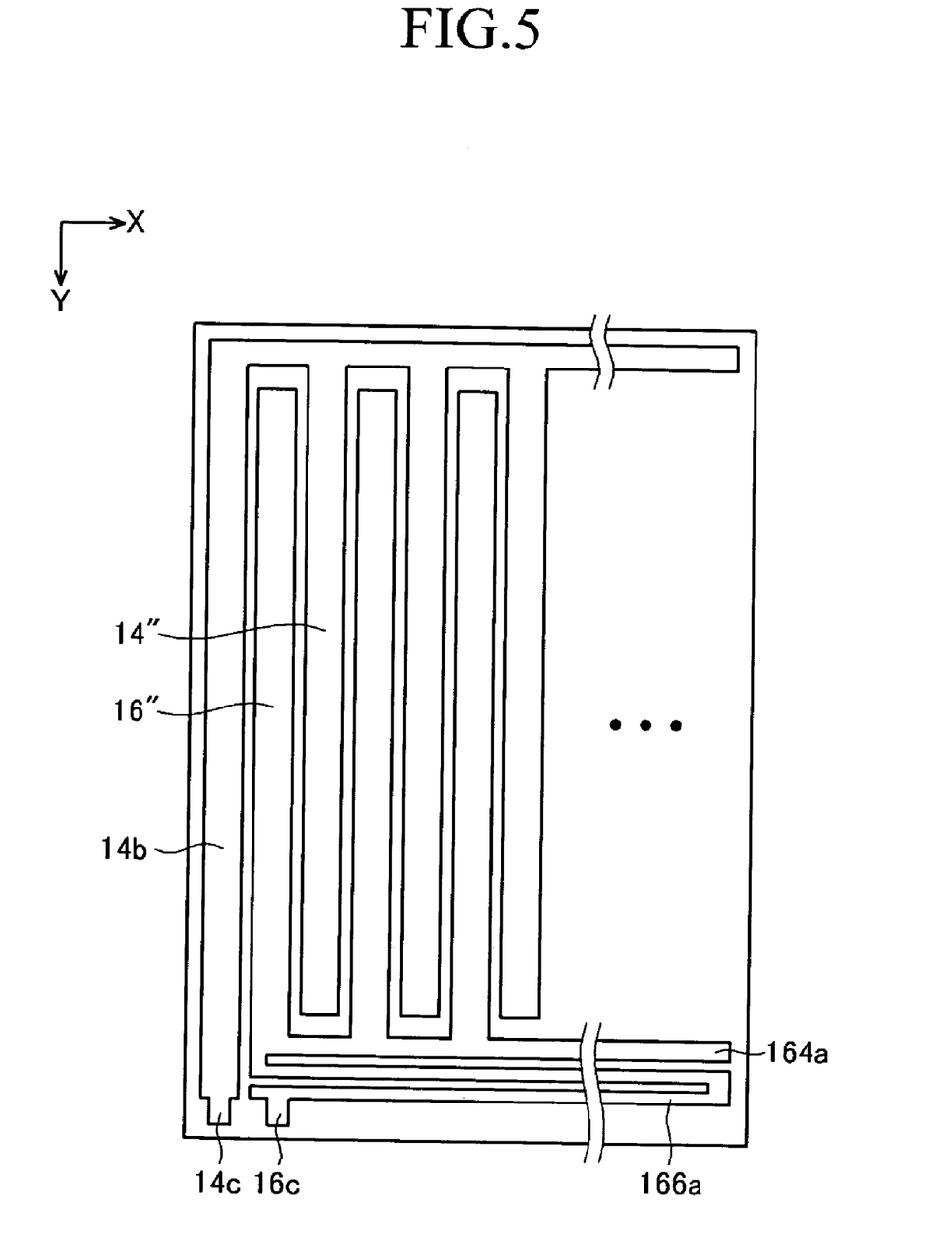
FIG. 5 is a plan view of a parallax barrier in a fourth exemplary embodiment of the present invention.

FIG. 5 is a plan view showing structures of first electrodes 14" and second electrodes 16" in a fourth exemplary embodiment of the present invention.

In a three-dimensional display device according to the fourth exemplary embodiment of the present invention, an auxiliary connection electrode 166*a* that lengthens a path along which a voltage is conducted is located between a second connection terminal 16*c* and a second connection electrode 164*a* such that voltages effectively applied to the first electrodes 14" and the second electrodes 16" can be maintained more equally.

When the voltages of a uniform level are applied at a first connection terminal 14*c* and a second connection terminal 16*c*, the voltage is applied from the second connection terminal 16*c* to the second electrodes 16" through the auxiliary connection electrode 166*a* and the second connection electrode 164*a*.

Thus, a voltage drop resulting over the first terminal electrode 14*b* is at least partially matched (or compensated) by a voltage drop resulting over the auxiliary connection electrode 166*a*.

The length, width, and material of the auxiliary connection electrode 166*a* can be chosen by considering the magnitude of the voltage drop over the first terminal electrode 14*b*.

The shape of the auxiliary connection electrode 166*a* is not limited to the specific shape shown in FIG. 5. It can also take on various suitable shapes such that the auxiliary connection electrode 166*a* effectively lengthens the voltage conducting path.

Since other elements of the three-dimensional display device according to the fourth exemplary embodiment are substantially similar to corresponding elements of the first exemplary embodiment described above, detailed description of the other elements is omitted.

The steps of decreasing resistance of the first terminal electrode and of increasing resistance of the second connection electrode that are described above may also be used in combination to control the voltage difference.

That is, the voltage effectively applied to the second electrodes can be reduced by including the auxiliary electrode, as described per the fourth exemplary embodiment. At the same time, the voltage drop over the first electrode can be reduced by widening the width of the first terminal electrode, as described per the first exemplary embodiment.

With this combination, the difference between the voltages effectively applied to the first electrodes and the second electrodes can be reduced further.

Figure 6:
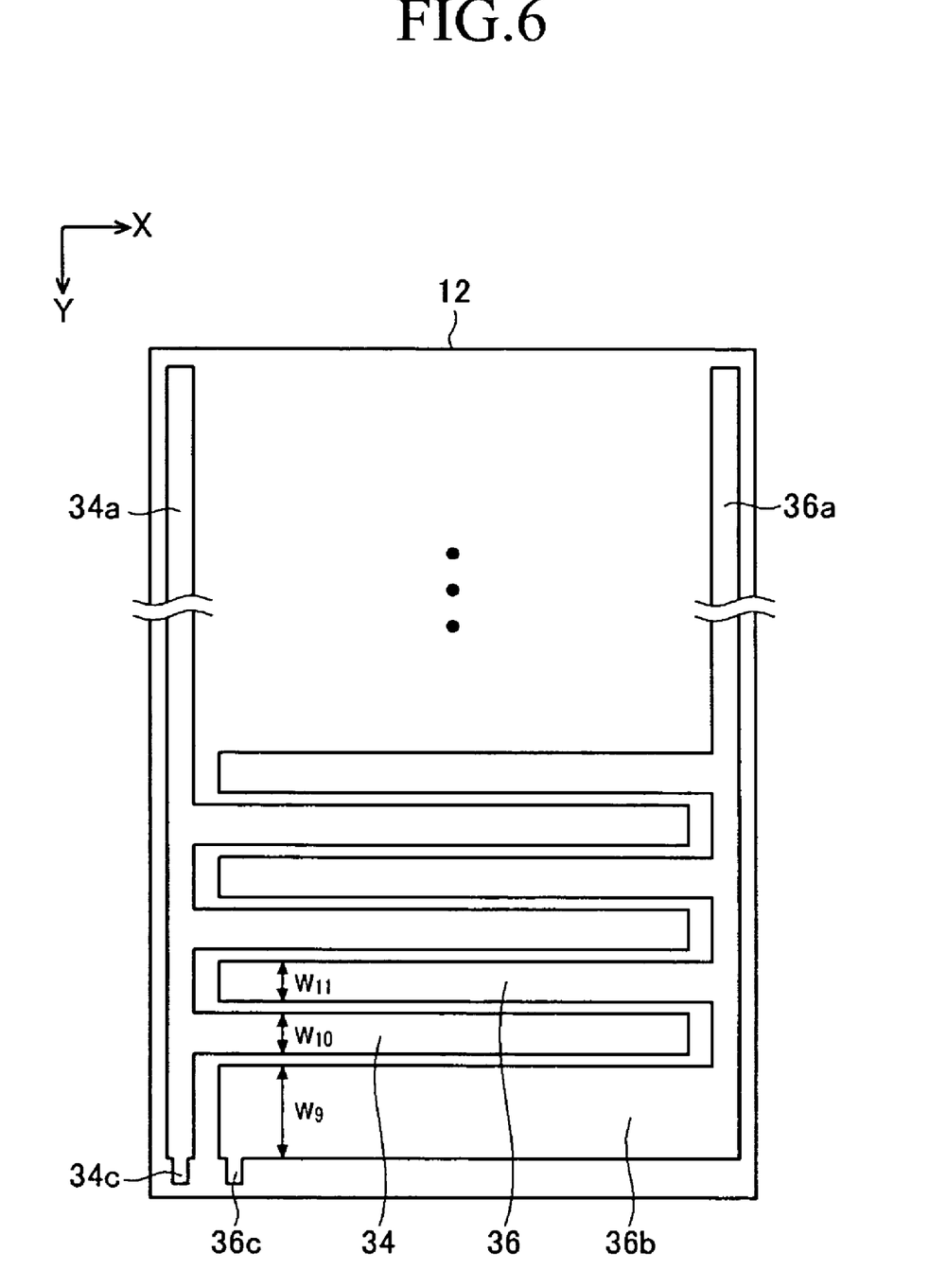
FIG. 6 is a plan view of a parallax barrier in a fifth exemplary embodiment of the present invention.

FIG. 6 shows third electrodes 34 and fourth electrodes 36 of a three-dimensional display device according to a fifth exemplary embodiment.

Since structures of other elements are substantially similar to corresponding elements of the first exemplary embodiment, a detailed description of the other elements is omitted. Thus, the structures of the third electrodes 34 and the fourth electrodes 36 will be described fully hereinafter.

The three-dimensional display device operates the first and second electrodes to separate images when providing a portrait-type view and operates the third and fourth electrodes 34 and 36 to separate images when providing a landscape-type view.

Since the structure of the first electrodes and the second electrodes located on the first substrate of the current exemplary embodiment is substantially similar to the first electrodes and the second electrodes of the first exemplary embodiment, a description of those electrodes is omitted.

As shown in FIG. 6, the third electrodes 34 located on the second substrate 12, extend along a first direction (the direction of the X-axis in FIG. 6) perpendicular to the direction along which the first electrodes and the second electrodes extend (see the direction of the Y-axis in FIG. 2, for example). And the third electrodes 34 are arranged along a second direction (the direction of the Y-axis in FIG. 6) in a striped pattern.

A third connection electrode 34a electrically connecting the third electrodes 34 extends along the second direction, which is perpendicular to the first direction and is connected to respective ends of the third electrodes 34.

A third connection terminal 34c is formed at an end of the third connection electrode 34a and applies voltage to the third electrodes 34 through the third connection electrode 34a.

In a substantially similar way, the fourth electrodes 36 extend along the first direction on the second substrate 12.

The fourth electrodes 36 are located between the third electrodes 34 in a striped pattern.

A fourth connection electrode 36a electrically connecting the fourth electrodes 36, extends along the second direction and is connected to respective ends of the fourth electrodes 36.

In addition, a fourth terminal electrode 36b extends along the second direction and is connected to an end of the fourth connection electrode 36a.

A fourth connection terminal 36c is formed at an end of the fourth terminal electrode 36b and applies voltage to the fourth electrodes 36 and the fourth connection electrode 36a through the fourth terminal electrode 36b.

In this case, the width of the fourth terminal electrode 36b $w_9$ is configured to be greater than respective widths of the third electrodes 34 and the fourth electrodes 36, $w_{10}$ and $w_{11}$.

When the user elects to view the landscape-type view, the user rotates the image display portion and parallax barrier that are oriented to provide the portrait-type view by 90 degrees.

In this case, patterns of pixels displaying left eye and right eye images corresponding to the landscape-type view are formed on the image display portion, and a driving voltage is applied to the third electrodes 34 and the fourth electrodes 36 during operation of the three-dimensional display device.

Since an operation providing a landscape-type view in the current exemplary embodiment is substantially similar to the operation providing the portrait-type view in the first exemplary embodiment, a detailed description of the operation providing the landscape-type view is omitted.

When the landscape-type view is provided, voltages of a similar level should be effectively applied to the third electrodes 34 and the fourth electrodes 36.

However, as shown in FIG. 6, since a voltage drop over the fourth terminal electrode 36b results, a voltage effectively applied to the fourth electrodes 36 is substantially lower than a voltage effectively applied to the third electrodes 34.

Thus, the width of the fourth terminal electrode 36b $w_9$ is configured to be greater than respective widths of the third electrodes 34 and the fourth electrodes 36, $w_{10}$ and $w_{11}$, to decrease electrical resistance of the fourth terminal electrode 36b.

The fourth terminal electrode may also be formed with a material such as silver (Ag) and copper (Cu) that has a relatively low resistivity in order to further reduce the voltage drop.

In addition, the resistance of the third connection electrode 36a may be increased to reduce the voltage effectively applied to the third electrode (see FIG. 4, for example). For example, the width of the third connection electrode 36a may be configured to be smaller than the width of the fourth connection electrode 36a.

Results of an experiment showing effects of the present invention will be described hereinafter.

EXPERIMENTAL EXAMPLE

A first terminal electrode was formed with a material used to form a first electrode and a second electrode. Also, the width of the first terminal electrode was configured to be 3.396 times greater than the respective widths of the first electrode and the second electrode.

An auxiliary connection electrode similar to that described in the fourth exemplary embodiment was formed at an end of a second connection electrode such that a path having an increased electrical resistance was made.

Also, relative transmission brightness according to the sampling time was measured. The first electrode and the second electrode were formed with ITO and had equal widths.

COMPARATIVE EXAMPLE

A first electrode and a second electrode were formed with ITO and had equal widths.

A first terminal electrode was made of a material also used to form the first electrode and the second electrode and had a width equal to respective widths of the first electrode and the second electrode.

An auxiliary connection electrode similar to that in the experimental example was not formed at an end of a second connection electrode. Other conditions were similar to corresponding conditions that were present in the experimental example.

Figure 7A:
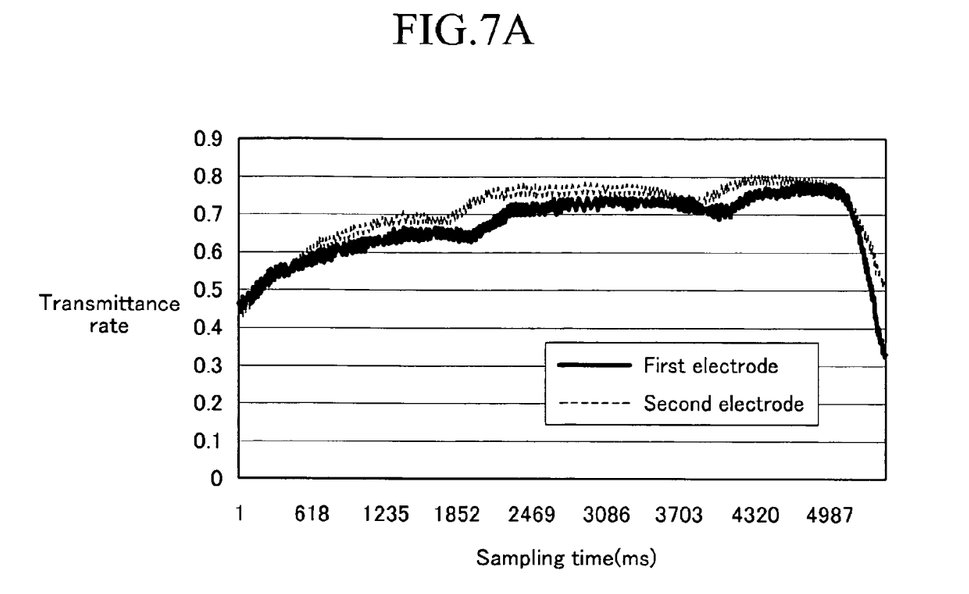
FIG. 7A and FIG. 7B are graphs showing experimental levels of transmission brightness.
Figure 7B:
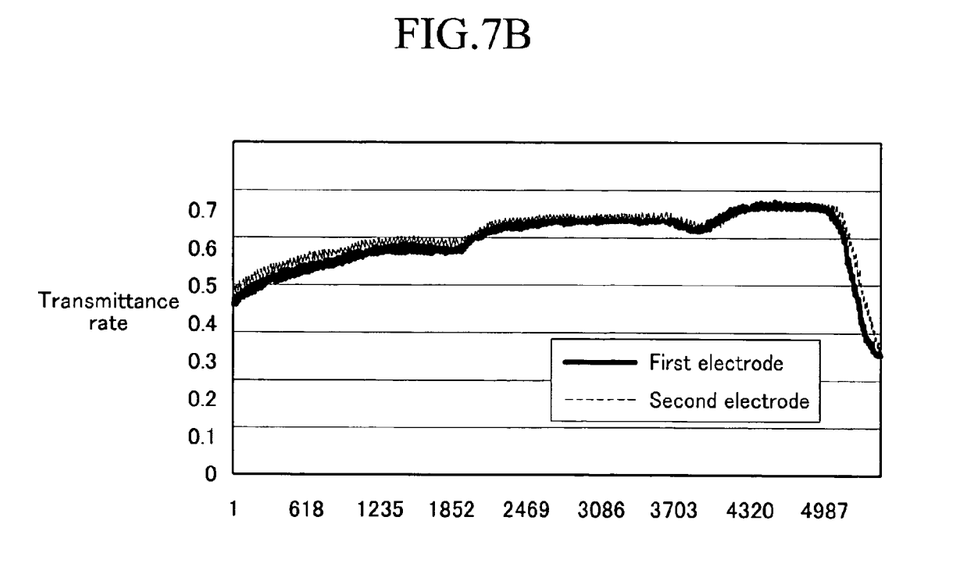

FIG. 7A and FIG. 7B show transmission brightness levels of the first electrode and the second electrode, as measured in the comparative example and the experimental example, respectively.

As shown in FIG. 7A, in the parallax barrier of the comparative example, differences in transmission brightness level between the first electrode and the second electrode resulted over time.

On the other hand, as shown in FIG. 7B, in the parallax barrier of the experimental example, differences in transmission brightness levels between the first electrode and the second electrode were reduced significantly, by way of example, by configuring the width of the first terminal electrode to be larger than respective widths of the first electrode and the second electrode.

Table 1 shows measured values of voltages effectively applied at the first electrode and the second electrode.

TABLE 1

|  | Comparative example | Experimental example |
|---|---|---|
| applied voltage(V) | −1.0 | −1.0 |
| First electrode(V) | 0.81625 | 0.57875 |
| second electrode(V) | 0.8725 | 0.575625 |
| Voltage difference(mV) | 56.25 | 3.12 |

In this manner, when a same voltage was applied, the difference between the voltage effectively applied at the first electrode and the voltage effectively applied at the second electrode was reduced significantly.

Thus, when a three-dimensional display device is operated in a time-shared mode, light transmission rates at each of a plurality of electrodes can be controlled to be substantially equal to each other.

As described above, the present invention provides a three-dimensional display device that can both provide high-resolution three-dimensional images and prevent deterioration of the quality of the three-dimensional images caused by a voltage drop over at least one of the electrodes.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three-dimensional display device comprising:
an image display portion adapted to display left eye images and right eye images; and
a parallax barrier facing the image display portion and adapted to direct the left eye images and the right eye images displayed by the image display portion toward a left eye and a right eye of a user, respectively, wherein the parallax barrier comprises:
a first substrate;
a plurality of first electrodes located on the first substrate;
a first connection electrode for electrically connecting the first electrodes;
a first terminal electrode connected to an end of the first connection electrode;
a first connection terminal connected to an end of the first terminal electrode and adapted to apply a voltage to the first electrodes and the first connection electrode;
a plurality of second electrodes located between the first electrodes;
a second connection electrode for electrically connecting the second electrodes;
a second connection terminal connected to an end of the second connection electrode and adapted to apply a voltage to the second electrodes and the second connection electrode;
a second substrate facing the first substrate;
a common electrode located on the second substrate; and
a liquid crystal layer located between the first and second substrates, wherein the first terminal electrode has an electric resistance lower than respective electric resistances of each of the first electrodes and the second electrodes.

2. The three-dimensional display device of claim 1, wherein the first terminal electrode is formed with a material used to form the first electrodes and the second electrodes and wherein the first terminal electrode has a width that is greater than respective widths of each of the first electrodes and the second electrodes.

3. The three-dimensional display device of claim 1, wherein the first terminal electrode is formed with a material that has a lower resistivity than a material used to form the first electrodes and the second electrodes.

4. The three-dimensional display device of claim 1, wherein the second connection electrode comprises an auxiliary connection electrode having a first end connected to the second connection terminal and having a second end connected to a portion of the second connection electrode connected to respective ends of each of the second electrodes, and wherein the auxiliary connection electrode is adapted to reduce the level of a voltage effectively applied to the second electrodes.

5. A three-dimensional display device comprising:
an image display portion adapted to display left eye images and right eye images; and
a parallax barrier facing the image display portion and adapted to direct the left eye images and the right eye images displayed by the image display portion toward a left eye and a right eye of a user, respectively, wherein the parallax barrier comprises:
a first substrate;
a plurality of first electrodes located on the first substrate;
a first connection electrode for electrically connecting the first electrodes;
a first terminal electrode connected to an end of the first connection electrode;
a first connection terminal connected to an end of the first terminal electrode and adapted to apply a voltage to the first electrodes and the first connection electrode;
a plurality of second electrodes located between the first electrodes;
a second connection electrode for electrically connecting the second electrodes;
a second connection terminal connected to an end of the second connection electrode and adapted to apply a voltage to the second electrodes and the second connection electrode;
a second substrate facing the first substrate;
a common electrode located on the second substrate; and
a liquid crystal layer located between the first substrate and the second substrate, wherein the second connection electrode has an electric resistance that is higher than an electric resistance of the first connection electrode.

6. The three-dimensional display device of claim 5, wherein the second connection electrode is formed with a material used to form the first connection electrode and wherein the second connection electrode has a width that is smaller than a width of the first connection electrode.

7. The three-dimensional display device of claim 5, wherein the second connection electrode is formed with a material that has greater resistivity than a material used to form the first connection electrode.

8. The three-dimensional display device of claim 5, wherein the second connection electrode comprises an auxiliary connection electrode having a first end connected to the second connection terminal and having a second end connected to a portion of the second connection electrode connected to respective ends of each of the second electrodes and wherein the auxiliary connection electrode is adapted to reduce the level of a voltage effectively applied to the second electrodes.

9. The three-dimensional display device of claim 5, wherein the first terminal electrode has an electric resistance lower than respective electric resistances of each of the first electrodes and the second electrodes.

10. A three-dimensional display device comprising:
a an image display portion adapted to display left eye images and right eye images; and
a parallax barrier facing the image display portion and adapted to direct the left eye images and the right eye images displayed by the image display portion towards a left eye and a right eye of a user, respectively, wherein the parallax barrier includes:
a first substrate;
a plurality of first electrodes located on the first substrate and extending along a first direction;
a first connection electrode for electrically connecting the first electrodes;
a first terminal electrode connected to an end of the first connection electrode;
a first connection terminal connected to an end of the first terminal electrode and adapted to apply a voltage to the first electrodes and the first connection electrode;
a plurality of second electrodes located between the first electrodes;
a second connection electrode for electrically connecting the second electrodes;
a second connection terminal adapted to apply a voltage to the second electrodes and the second connection electrode;
a second substrate facing the first substrate;
a plurality of third electrodes located on the second substrate and extending along a second direction that is perpendicular to the first direction;
a third connection electrode for electrically connecting the third electrodes;
a third connection terminal adapted to apply a voltage to the third electrodes and the third connection electrode;
a plurality of fourth electrodes located between the third electrodes;
a fourth connection electrode for electrically connecting the fourth electrodes;
a fourth terminal electrode connected to an end of the fourth connection electrode;
a fourth connection terminal connected to an end of the fourth terminal electrode and adapted to apply a voltage to the fourth electrodes and the fourth connection electrode; and
a liquid crystal layer located between the first substrate and the second substrate, wherein each of the first electrodes and the second electrodes have respective widths equal to each other,
wherein the first terminal electrode has an electric resistance lower than respective electric resistances of each of the first electrodes and the second electrodes,
wherein each of the third electrodes and the fourth electrodes have respective widths equal to each other, and
wherein the fourth terminal electrode has an electric resistance lower than respective electric resistances of each of the third electrodes and the fourth electrodes.

11. The three-dimensional display device of claim 10, wherein the first terminal electrode is formed with a material used to form the first electrodes and the second electrodes and has a width that is greater than respective widths of each of the first electrodes and the second electrodes, and
wherein the fourth terminal electrode is formed with a material used to form the third electrodes and the fourth electrodes and has a width that is greater than respective widths of each of the third electrodes and the fourth electrodes.

12. The three-dimensional display device of claim 10, wherein the first terminal electrode is formed with a material that has a lower resistivity than a material used to form the first electrodes and the second electrodes,
and wherein the fourth terminal electrode is formed with a material that has a lower resistivity than a material used to form the third electrodes and the fourth electrodes.

13. The three-dimensional display device of claim 10, wherein the second connection electrode has a width that is smaller than a width of the first connection electrode, and
wherein the third connection electrode has a width that is smaller than a width of the fourth connection electrode.

14. The three-dimensional display device of claim 10, wherein the second connection electrode has an electric resistance that is higher than an electric resistance of the first connection electrode.

15. The three-dimensional display device of claim 14, wherein the third connection electrode has an electric resistance that is higher than an electric resistance of the fourth connection electrode.

16. The three-dimensional display device of claim 10, wherein the third connection electrode has an electric resistance that is higher than an electric resistance of the fourth connection electrode.

17. The three-dimensional display device of claim 10, wherein the second connection electrode comprises an auxiliary connection electrode having a first end connected to the second connection terminal and having a second end connected to a portion of the second connection electrode connected to respective ends of each of the second electrodes and wherein the auxiliary connection electrode is adapted to reduce the level of a voltage effectively applied to the second electrodes.

* * * * *